United States Patent [19]

Inoue

[11] 4,399,482
[45] Aug. 16, 1983

[54] MAGNETIC HOLDER

[75] Inventor: Kiyoshi Inoue, Tokyo, Japan

[73] Assignee: Inoue-Japax Research Incorporated, Yokohama, Japan

[21] Appl. No.: 119,564

[22] Filed: Feb. 7, 1980

[30] Foreign Application Priority Data

Feb. 8, 1979 [JP] Japan .................................. 54-14044

[51] Int. Cl.³ .............................................. H01F 7/04
[52] U.S. Cl. .................................... 361/145; 361/156; 335/289
[58] Field of Search ....................... 361/145, 144, 156; 335/289, 290, 291, 295

[56] References Cited

U.S. PATENT DOCUMENTS

| 2,348,967 | 5/1944 | Duby | 335/295 |
|---|---|---|---|
| 2,421,716 | 6/1947 | Rose . | |
| 2,445,459 | 7/1948 | Snyder | 335/290 |
| 3,093,774 | 6/1963 | Christianson | 361/156 |
| 3,209,891 | 10/1965 | Littwin | 198/41 |
| 3,303,398 | 2/1967 | Barta | 361/156 |
| 3,783,344 | 1/1974 | Ono et al. | 361/144 |
| 3,798,581 | 3/1974 | Anderson | 335/291 |
| 3,806,336 | 4/1974 | Kaneko et al. . | |
| 3,954,519 | 5/1976 | Inoue | 148/31.57 |
| 3,969,657 | 7/1976 | Oettinghaus . | |
| 3,989,556 | 11/1976 | Iwata et al. | 148/31.55 |
| 4,171,978 | 10/1979 | Inoue et al. | 75/126 E |

FOREIGN PATENT DOCUMENTS 2256521 5/1973 Fed. Rep. of Germany ...... 361/144
2647503 6/1977 Fed. Rep. of Germany .

Primary Examiner—G. Z. Rubinson
Attorney, Agent, or Firm—Karl F. Ross; Herbert Dubno

[57] ABSTRACT

A magnetic holder for releasably retaining a ferromagnetic object, having a core member composed of a semi-hard magnetic material magnetized permanently by an instantaneous capacitor discharge current passing in a first direction through coils wound on the core member to permanently retain the object. The capacitor discharge current is passed in a second direction opposite to the first through the coils to demagnetize the previously magnetizer core member and allow the object to be magnetically released.

2 Claims, 2 Drawing Figures

MAGNETIC HOLDER

FIELD OF THE INVENTION

The present invention relates to a magnetic holder and, more particularly, to an improved magnetic holder for releasably retaining a ferromagnetic or magnetically susceptible object, e.g. a workpiece in a machine tool or an article to be retentively carried on a crane, conveyor or the like transportation system.

BACKGROUND OF THE INVENTION

Conventional magnetic holders, also commonly called magnetic chucks, make use of a core member composed of a magnetically permeable or magnetically "soft" material as constituting an electromagnet with a coil wound on the core member. In these systems, the coil must be continuously energized to keep the core member magnetized by a continuous direct-current source during the time in which an object is to be held in position and the release of the object from the retention position is effected by simple disconnection of the power supply which demagnetizes the core member. During the retention period, however, the continuous passage of the energization current through the coil gives rise to the generation of heat which may cause thermal distortion of the retained object, a holding table and other surrounding components. In a machine tool, for example, such distortion is undesirable since machining accuracy is seriously influenced thereby. Furthermore, even an accidental stoppage of the power supply causes the object to be unintentionally released and this may lead to dangerous results.

SUMMARY OF THE INVENTION

The disadvantages of the prior art discussed above are overcome by the present invention.

In accordance with the present invention, there is provided an improved magnetic holder for releasably retaining a ferromagnetic or magnetically susceptible object, which comprises a core member composed of a semi-hard magnetic or magnetically semi-hard material, a coil disposed for the magnetization and demagnetization of the core member, a source of a unidirectional electrical pulse connectable to the coil, and switch means having a pair of operative positions and being operable in its first position for passing an essentially unidirectional electrical pulse from the source through said coil in a first direction to retentively magnetize the core member and operable in its second position for passing a unidirectional electrical pulse from the source through the coil in a second direction opposite to the first to demagnetize the core member.

Semi-hard magnets have widely been used as various meters, brakes clutches and motors and are characterized by possessing a relatively low coercive force and capability of both permanent magnetization and demagnetization with ease. The material, once magnetized, is capable of retaining magnetism without continued external energization. In the present disclosure, the term "semi-hard magnetic materials" or "magnetically semi-hard materials" may be defined as a magnetic material having a residual flux density (Br) of not less than 6000 Gauss and a coercive force in the range between 100 and 1000 Oersted, preferably not greater than 600 Oersted. While any of other known materials such as Al-Ni-Co-Fe alloys, Cr-Mo-Fe alloys, Fe-Cr-V alloys and Fe-Mn-Ti alloys may be used, preference is herein given to use a spinodal decomposition type alloy embodied as any of Fe-Cr-Co, Fe-Cr-Co-Mo, Fe-Cr-Co-W, Fe-Cr-Co-Nb, Fe-Cr-Co-Nb-Al and Fe-Cr-Co-V as described in U.S. Pat. No. 3,806,336 issued Apr. 23, 1974, U.S. Pat. No. 3,954,519 issued May 4, 1976 and U.S. Pat. No. 4,171,978 issued Oct. 23, 1979, or modifications or additions of these alloys because of desirable magnetic properties highly suitable to this end.

SPECIFIC DESCRIPTION

Figure 1:
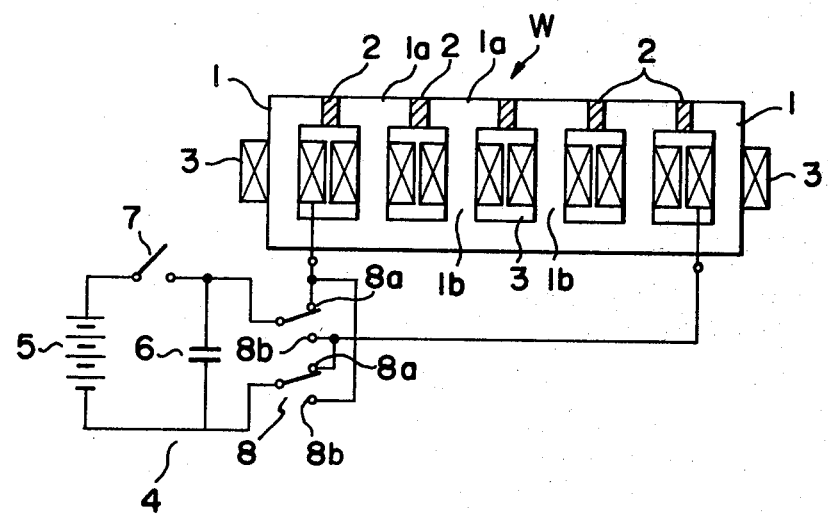
FIG. 1 is a schematic view partly in section diagrammatically illustrating a magnetic holder embodying the present invention.
Figure 2:
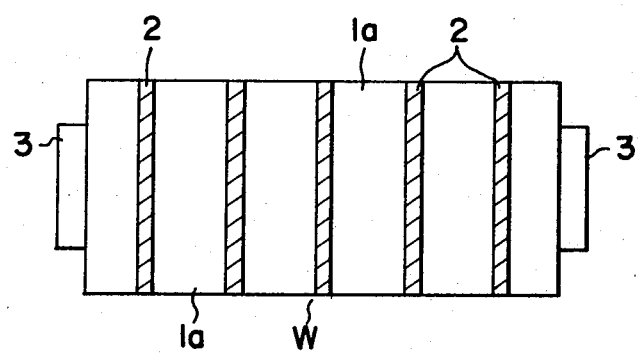
FIG. 2 is a plane view of a working surface of the magnetic holder of FIG. 1.

A core member 1 composed of a semi-hard magnetic material is provided which at a working surface W forms a plurality of parallel magnetic zones 1a separated from one another by nonmagnetic or magnetically nonpermeable strip zones 2, where the adjacent zones 1a flush therewith provide a magnetic gap. A plurality of coils 3 connected in series are placed on the core member 3 so as to surround respectively a plurality of leg portions 1b thereof supporting the parallel magnetic working zones 1a and are energized by a power supply 4 so that magnetic fluxes generated traverse the working face W. The power supply 4 is constituted by a DC source 5 and a capacitor 6 connected in series therewith via a charging switch 7. When the switch 7 is closed, the direct current from the source 5 is allowed to flow to charge the capacitor 6. Upon charging of the capacitor 6, the switch 7 is opened to disconnect it from the DC source 5. The capacitor 6 is also connectable with the serially connected coils 3 via a polarity reversal switch 8 which has a pair of operative positions. When the switch 8 is put into one position 8a or another 8b, the capacitor 6 is connected to the coil 3 to impulsively discharge the charge stored therein, thereby passing an essentially unidirectional current pulse through the coils 3 in one direction or another.

The position 8a in which the switch 8 is shown placed is adapted to pass to electrical current pulse through the coils 3 in such a direction that the semi-hard magnetic core member 1 is magnetized thereby. Once magnetized, the core member 1, because of its semi-hard characteristic, is capable of retaining its magnetization to continuously attract a ferromagnetic or magnetically susceptible object, e.g. a workpiece in a machine tool or any other article (not shown) onto the working zones 1a without continued energization of the coils 3. Thus, after discharging of the capacitor 6, the switch 8 is placed in a neutral position to disconnect it from the coils 3 whereupon the switch 7 is closed to allow recharging of the capacitor 6 by the DC source 5.

The demagnetization of the core member 1 is achieved by placing the switch 8 in the position 8b upon opening of the charging switch 7. This causes the charge stored on tthe capacitor 6 to be again impulsively discharged through the coils 3. The resulting unidirectional current pulse through the energizing coils 3 in this instance is such that the core member 1 previously magnetized is demagnetized thereby to allow the object previously held to be released.

A highly satisfactory magnetic holding device is thus provided which permits selective retention and releasing of a ferromagnetic or magnetically permeable object by instantaneous magnetization and demagnetization of the core member 1 without the need for continued energization of the coils 3 while the object is being retained as desired.

The use of an impulsive electrical current as shown to energize the coils 3 in the separate instances is advantageous to effectively and readily magnetize and demagnetize the core member 1, although a continuous DC pulse may also be used in each instance.

There is thus provided in accordance with the present invention an improved magnetic holder for releasably retaining a ferromagnetic object, which allows the magnetization and demagnetization of a core member 1 to be effected with facility and which permits the object to be kept retained in situ after deenergization of the operating coils 3 upon magnetization of the core member 1. This advantageously eliminates the conventional requirement for the continued application of the energization current during the operating period in which the object is to be held and effectively reduces the electrical power needed while alleviating the problem of heat generation and operating trouble as met by prior magnetic holding devices. Furthermore, the proposed device facilitates electrical insulation of energization coils and, since it allow conductors constituting the coils to be thinner, advantageously makes the unit compact and less costly for manufacture. It should also be noted that the freedom from energization current during the retention period eliminates the possibility of the object unintentionally to dislodge by accidental power failure or stoppage during that period. A trouble-free magnetic holder which allows an extremely easy retention and detachment operations is thus provided.

While the embodiment of the invention illustrated makes use of a semi-hard magnetic body constituting the core member integrally entending from the base portion to the working zones, the latter zones may be constituted by separate plates of a magnetically permeable or soft material adapted to carry magnetic flux generated by the supporting core member of semi-hard magnetic material.

What is claimed is:

1. A magnetic holder for releasably retaining a ferromagnetic object, comprising:

a core member composed of a magnetically semi-hard material capable of magnetic retention after magnetization without substantial reduction, said material consisting essentially of a semi-hard spinodal-decomposition type magnetic alloy having a coercive force not greater than 600 oersted;

coil means disposed in inductive relation to said member for the magnetization and demagnetization of said core member;

a source of an essentially unidirectional momentary short-duration electrical pulse connectable to said coil means; and a single multiposition switch between said coil means and said source, said switch having a pair of operative positions and being operable in a first of said positions for passing said essentially unidirectional momentary short-duration electrical pulse from said source through said coil means in a first direction to retentively magnetize said core member and thereby enable it to retain said object for an entire holding duration after disappearance of said pulse, said switch being operable in its second position for passing a subsequent essentially unidirectional momentary short-duration electrical pulse from said source through said coil means in a second direction opposite to the first direction to permanently demagnetize said core member.

2. A magnetic holder for releasably retaining a ferromagnetic object, comprising:

a core member composed of a magnetically semi-hard material capable of magnetic retention after magnetization without substantial reduction, said material consisting essentially of a semi-hard spinodal-decomposition type magnetic alloy having a coercive force not greater than 600 oersted;

coil means disposed in inductive relation to said member for the magnetization and demagnetization of said core member;

a source of an essentially unidirectional momentary short-duration electrical pulse connectable to said coil means; and a single multiposition switch between said coil means and said source, said switch means having a pair of operative positions and being operable in a first of said positions for passing said essentially unidirectional momentary short-duration electrical pulse from said source through said coil means in a first direction to retentively magnetize said core member and thereby enable it to retain said object for an entire holding operation after disappearance of said pulse, said switch being operable in its second position for passing a subsequent single essentially unidirectional momentary short-duration electrical pulse from said source through said coil means in a second direction opposite to the first direction to permanently demagnetize said core member, said source of a unidirectional momentary short-duration electrical pulse comprising a direct-current source and a capacitor for charging by said DC source and for discharging through said coil means upon said switch being brought into each of said first and second positions to provide said essentially unidirectional momentary short-duration electrical pulse through said coil means in the first and second directions respectively.

* * * * *